United States Patent
Kurahashi

(10) Patent No.: US 9,659,489 B2
(45) Date of Patent: May 23, 2017

(54) DISPLAY APPARATUS

(71) Applicant: DENSO CORPORATION, Kariya, Aichi-pref (JP)

(72) Inventor: Mitsuyuki Kurahashi, Toyota (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 23 days.

(21) Appl. No.: 13/769,509

(22) Filed: Feb. 18, 2013

(65) Prior Publication Data

US 2013/0215593 A1 Aug. 22, 2013

(30) Foreign Application Priority Data

Feb. 22, 2012 (JP) .................................. 2012-036548

(51) Int. Cl.
*G08C 23/06* (2006.01)
*B60K 37/02* (2006.01)
*G01D 11/28* (2006.01)

(52) U.S. Cl.
CPC .............. *G08C 23/06* (2013.01); *B60K 37/02* (2013.01); *B60K 2350/203* (2013.01); *B60K 2350/967* (2013.01); *G01D 11/28* (2013.01)

(58) Field of Classification Search
CPC ........ B60Q 3/044; B60Q 3/004; B60Q 3/025; B60Q 1/124; B60Q 1/2619; B60K 37/02; B64D 2011/0038; B64D 11/00; G01D 11/28; G04B 19/30; G05G 1/105; H01H 19/025
USPC ........ 362/489, 482, 471, 23.07, 23.09, 23.1, 362/23.12, 23.14, 23.18, 23.17, 23.19, 362/23.21
See application file for complete search history.

(56) References Cited

U.S. PATENT DOCUMENTS

| 5,477,422 | A |  | 12/1995 | Hooker et al. |
| 5,815,072 | A | * | 9/1998 | Yamanaka et al. ........... 340/461 |
| 6,302,551 | B1 | * | 10/2001 | Matumoto ....................... 362/27 |
| 6,461,006 | B1 | * | 10/2002 | Matumoto ....................... 362/27 |

(Continued)

FOREIGN PATENT DOCUMENTS

| JP | 62-99893 | 6/1987 |
| JP | 2006-219055 | 8/2006 |

(Continued)

OTHER PUBLICATIONS

Office action dated Dec. 10, 2013 in corresponding Japanese Application No. 2012-036548.

(Continued)

*Primary Examiner* — Jong-Suk (James) Lee
*Assistant Examiner* — Mark Tsidulko
(74) *Attorney, Agent, or Firm* — Harness, Dickey & Pierce, P.L.C.

(57) ABSTRACT

A display apparatus is disclosed, which includes a display unit, an opening member, a light source, a light transmission member, and a buffer having a buffer main portion and a light block portion. The buffer main portion is held between the display unit and the light transmission member. The light block portion protrudes from the buffer main portion along an opposing surface of the light transmission member opposing the display unit, and covers a reached region of the opposing surface to which a direct light from the light source toward an opening of the opening member reaches.

14 Claims, 3 Drawing Sheets

(56) References Cited

U.S. PATENT DOCUMENTS

| | | | |
|---|---|---|---|
| 6,502,968 B1* | 1/2003 | Simon | 362/489 |
| 6,883,934 B2* | 4/2005 | Kawakami et al. | 362/261 |
| 7,347,575 B2* | 3/2008 | Fong et al. | 362/23 |
| 7,629,874 B2* | 12/2009 | Araki et al. | 340/425.5 |
| 8,313,963 B2* | 11/2012 | Pan | 438/29 |
| 8,319,653 B2* | 11/2012 | Takebe et al. | 340/691.6 |

FOREIGN PATENT DOCUMENTS

| | | |
|---|---|---|
| JP | 2009-210302 | 9/2009 |
| JP | 2010-223334 | 10/2010 |
| JP | 2010-281983 | 12/2010 |

OTHER PUBLICATIONS

Search/Examination Report dated Feb. 11, 2015 in the corresponding CN application No. 201310055247.9 with English translation.

* cited by examiner

DISPLAY APPARATUS

CROSS REFERENCE TO RELATED APPLICATION

The present application is based on Japanese Patent Application No. 2012-36548 filed on Feb. 22, 2012, disclosure of which is incorporated herein by reference.

TECHNICAL FIELD

The present disclosure relates to a display apparatus for displaying information on a display screen.

BACKGROUND

Patent Documents 1 and 2 disclose a display apparatus that includes a liquid crystal display (LCD) unit and a light source for radiating light for illuminating a display screen of the LCD unit. As described in Patent Document 1, the LCD unit of such a display apparatus is held in a casing or the like such that the LCD unit is held between a cylindrical portion and a protruding portion of a decorative member opposing the cylindrical portion. A display apparatus of Patent Document 2 further includes a light guide located on an opposite side of a LCD unit from a dial plate. The light guide has a base portion and an irradiation portion. The base portion extends from the irradiation portion toward a light source that is located at a place other than a region that overlaps an opening of the dial plate in a displaying direction. Because of this structure, the light, which is emitted from the light source and incident on the base portion, is guided to the irradiation portion and emitted from the irradiation portion toward the display screen.

In the above display apparatus, externally-inputted vibration can cause backlashes of parts of the display apparatus. To reduce such backlash, the measuring device disclosed in, for example, Patent Document 3 is provided with a sheet-like buffer material, which is located between a hole portion of a facing member and a protruding portion of a see-through plate. The display apparatus disclosed in Patent Document 4 is provided with a non-woven cloth as a buffer material between a flexible printed circuit (FPC) board and a position-determining flange.

Patent Document 1: JP-2006-219055A
Patent Document 2: JP-2009-210302A
Patent Document 3: JP-2010-223334A
Patent Document 4: JP-2010-281983A In a display apparatus as disclosed in Patent Document 2, a part of light radiated from a light source is radiated toward an opening in a dial plate. This direct light from the light source travels straight, passes through a light guide, and illuminates a display screen in a different way than the light emitted from the irradiation portion illuminates the display screen. Therefore, a portion of the display screen to which the direct light reaches is brighter than the other portion of the display screen. As a result, non-uniform light emission in the illumination of the display screen arises.

SUMMARY

In view of the foregoing, it is an object of the present disclosure to provide a display apparatus which can reduce non-uniform light emission in illumination of a display screen, while preventing a structure from becoming complicated.

According to a first example, a display apparatus includes a display unit, an opening member, a light source, a light transmission member, a holder, and a buffer member. The display unit has a display screen for displaying information in a displaying direction. The opening member is located in a displaying direction of the display unit and defines a display opening in a region that overlaps the display screen in the displaying direction. The light source is located at a place other than a region that overlaps the display opening in the displaying direction. The light source radiates a light for illuminating the display screen. The light transmission member is made of a light transmission material, and includes an emission main body portion and a light guide portion. The emission main body portion is located on an opposite side of the display unit from the opening member so that the display unit is located between the emission main body portion and the opening member, and the emission main body portion emits the light from the light source toward the display screen in the displaying direction. The light guide portion protrudes from the emission main body portion toward the light source to guide the light from the light source to the emission main body portion. The holder holds the light transmission member and the display unit. The holder includes a support portion and a holding portion. The support portion supports the light transmission member. The light transmission member and the display unit are held between the support portion and the holding portion. The buffer member includes a buffer main body portion and a light block portion. The buffer main body portion is sandwiched between the display unit and the light transmission member while being compressed, so that by a restoring force, the buffer main body portion presses the display unit toward one of the support portion and the holding portion and presses the light transmission member toward the other of the support portion and the holding portion. The light block portion protrudes from the buffer main body portion along an opposing surface of the light transmission member opposing the display unit, and covers a reached region of the opposing surface of the light transmission member. The reached region of the opposing surface of the light transmission member is a region to which a direct light radiated from the light source toward the display opening reaches.

According to the above display apparatus, the reached region of the opposing surface of the light transmission member, to which the direct light radiated from the light source toward the display opening reaches, is covered with the light block portion having a light blocking property. Because of this, a situation where the direct light, which travels straight in its radiating direction and passes through the light guide portion, illuminates the display screen of the display unit, does not occur. In addition, the light block portion, which protrudes from the buffer main body portion along the opposing surface of the light transmission member, can eliminate the need to add a member for blocking the light. Moreover, since the buffer main body portion in a compressed state is held between the display unit and the light transmission member, the light block portion protruding from the buffer main body portion is prevented from being displaced of the light transmission member even when vibration is continuously inputted from an outside. As a result, the light block portion can continue to cover the reached region of the opposing surface reached by the direct light and can continue to block the direct light. Therefore, it is possible to reduce un-uniform light emission in illuminating the display screen, while preventing a structure of the display apparatus from becoming complicated.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
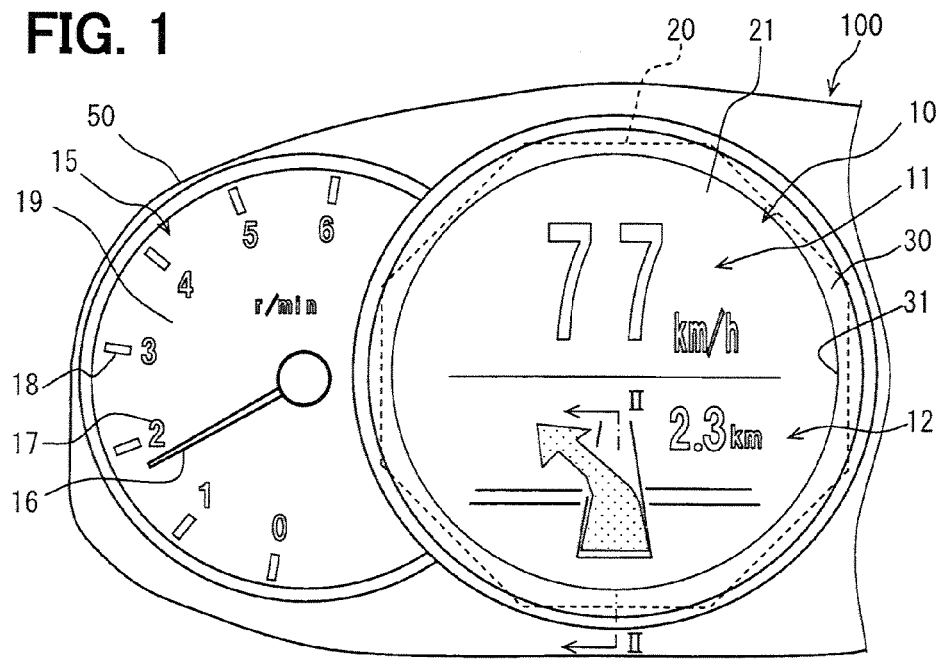
FIG. 1 is a front view of a combination meter according to one embodiment.

Embodiments will be described below based on the drawings. A combination meter 100 illustrated in FIG. 1 according to one embodiment is received in an instrument panel in a vehicle compartment in a vehicle and is arranged so that a front side of the combination meter 100 shown in FIG. 1 faces toward a driver's seat.

(Basic Configuration)

A basic configuration of the combination meter 100 will be illustrated. The combination meter 100 acts as a display apparatus for displaying various informations about the vehicle. The combination meter 100 includes multiple display units such as a tachometer 15 for displaying the rotation speed of the output shaft of an internal combustion engine mounted in the vehicle, and a multi-information display 10 for switchably displaying various informations about the vehicle. Display of the tachometer 15 is formed with a rotatable pointer 16, a dial plate 19, and the like. The dial plate 19 has multiple letter portions 17 and multiple scale portions 18 which are located along a rotation orbit of the pointer 16. The display of the multi-information display 10 is formed with various images drawn on a circular display screen 21. The multi-information display 10 displays, for example, a vehicle speed image 11 indicative of the traveling speed of the vehicle, a turn-by-turn image 12 indicative of a route to a destination point which may be set in a navigation system, and the like.

Next, a mechanical configuration and an electric configuration of the combination meter 100 will be illustrated with reference to FIGS. 1 to 4. It should be noted that, in the following description, a direction which is substantially normal (perpendicular) to the display screen 21 and in which the display screen 21 faces is referred to as a displaying direction. Additionally, a direction opposite to the displaying direction is referred to as a rearward direction.

The combination meter 100 includes a liquid crystal display (LCD) unit 20, a display plate 30, a light source 60, a light guide 40, a casing 50, a buffer sheet 70 etc. In addition, the combination meter 100 includes a meter controller 81 and a stepper motor 82 as an electric configuration.

Figure 2:
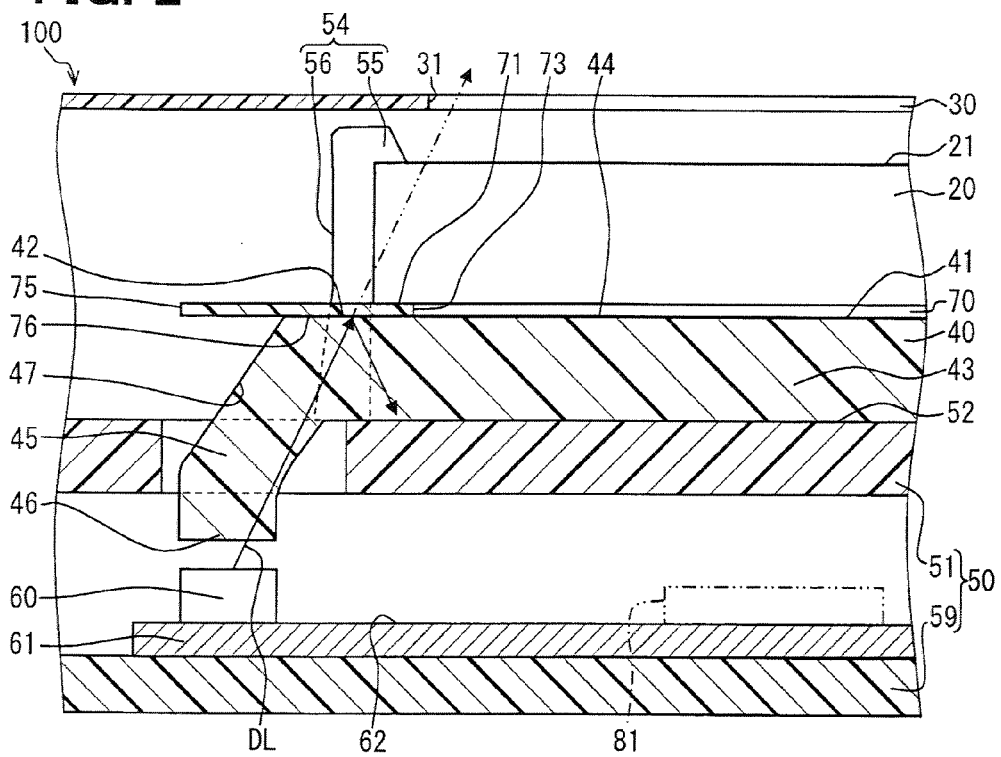
FIG. 2 is a cross-sectional view of the combination meter taken along line II-II of FIG. 1.

The LCD unit 20 shown in FIGS. 1 and 2 has a display screen 21 for displaying the above-described information. The LCD unit 20 is a display unit that uses a dot matrix method to implement color display by controlling multiple pixels arranged on the display screen 21. The LCD unit 20 is connected to the meter controller 81. On the display screen 21, the LCD unit 20 sequentially forms a data of an image acquired from the controller 81, thereby displaying an image such as the vehicle speed image 11 and the turn-by-turn image 12.

The display plate 30 is made of a resin material and formed into an annular shape. The display plate 30 is attached to the casing 50 and located in the displaying direction from the LCD unit 20. The display plate 30 defines a circular display opening 31. The display opening 31 is formed in a region overlapping the display screen 21 in the displaying direction, so that in the displaying direction, the display screen 21 is viewable from a user.

The light source 60 includes a light emitting element such as a light emitting diode or the like. When a voltage is applied by the meter controller 81, the light emitting element radiates, for example, white light. Together with the stepper motor 82 (see FIG. 3), the meter controller 81 and the like, the light source 60 is mounted on a mounting surface 62 of a circuit board 61. The mounting surface 62 is one of opposite surfaces of the circuit board 61 that faces in the displaying direction. The light source 60 is located in the rearward direction from the light guide 40 and is mounted at a place other than an overlapping region of the mounting surface 62, where the overlapping region of the mounting surface 62 is a region that overlaps the display opening 31 in the displaying direction. The light source 60 radiates the light for illuminating the display screen 21 toward the light guide 40, which is located in the displaying direction from the light source 60.

The light guide 40 is made of a light transmission material (transparent material) such as an acrylic resin or a polycarbonate resin. The light guide 40 has a light guide portion 45 and a backlight portion 43. The light guide portion 45 protrudes from the backlight portion 43 toward the light source 60 in such an inclined manner that the light guide portion 45 extends away from the display opening 31 with increasing distance in the rearward direction. The light guide portion 45 has an incidence surface 46 and a reflecting surface 47. The incidence surface 46 opposes the light source 60 in the displaying direction. The reflecting surface 47 is located in the displaying direction from the incidence surface 46, and is directed toward the incidence surface 46 and the backlight portion 43. The light coming from the light source 60, incident on the incidence surface 46, and traveling through the light guide 40 is reflected at the reflecting surface 47 of the light guide portion 45 to the backlight portion 43. In this way, the light guide 40 guides the light to the backlight portion 43.

The backlight portion 43 is located on an opposite side of the LCD unit 20 from the display plate 30 so that the LCD unit 20 is located between the backlight portion 43 and the display plate 30. The light from the light source 60 guided by the light guide portion 45 is diffused inside the backlight portion 43, and the diffused light is emitted from an emission surface 44 opposing the LCD unit 20, so that the emission surface 44 uniformly emits the light. The emission surface 44 is a part of an opposing surface 41 of the light guide 40, where the opposing surface 41 opposes the LCD unit 20. The emission surface 44 is formed in an overlapping region of the opposing surface 41, so that an area of the emission surface 44 is slightly larger than an area of the display screen 21 and an area of the display opening 31. In the above, the overlapping region of the opposing surface 41 is a region that, in the displaying direction, overlaps the display screen 21 and the display opening 31.

The casing 50 is provided by assembling together multiple members such as a rear cover 59, a main body member 51, and a transparent front panel. The casing 50 receives the LCD unit 20, the light guide 40, the circuit board 61, and the like. The rear cover 59 is made of a resin material. The rear cover 59 is located in the rearward direction from the main body member 51 and is attached to the main body member 51 from the rearward direction so that the rear cover 59 covers the circuit board 61.

The main body member 51 is made of a resin material having excellent flexibility such as a polyamide resin or the like. The main body member 51 is located between the display plate 30 and the rear cover 59 to hold the elements 30 and 59. The main body member 51 has a mounting portion 52 and holding claws 54. The mounting portion 52 is formed into a plate shape and located on an opposite side of the backlight portion 43 from the LCD unit 20 so that the backlight portion 43 is located between the mounting portion 52 and the LCD unit 20. On the mounting portion 52, the light guide 40 and the LCD unit 20 are mounted. The mounting portion 52 supports the light guide 40 and the LCD unit 20 from the rearward direction. The multiple holding claws 54 are provided in the main body member 51. The holding claw 54 has a claw main body portion 56 and a tip portion 55. The claw main body portion 56 extends from the mounting portion 52 in the displaying direction. The tip portion 55 is at a tip of the claw main body portion 56 in an extending direction of the claw main body portion 56 and protrudes from the claw main body portion 56 along the display screen 21, so that the tip portion 55 opposes the mounting portion 52. By deflecting the claw main body portion 56 in a direction opposite to a protruding direction of the tip portion 55, the holding craw 54 enables the LCD unit 20 and the light guide 40 to be located between the mounting portion 52 and the tip portion 55. The holding claws 54 lock a portion of the LCD unit 20 serving as an outer periphery portion of the display screen 21 (see FIG. 5), thereby holding the LCD unit 20 and the light guide 40 between the multiple tip portions 55 and the mounting portion 52. In this manner, the main body member 51 holds the LCD unit 20 and the light guide 40.

Figure 4:
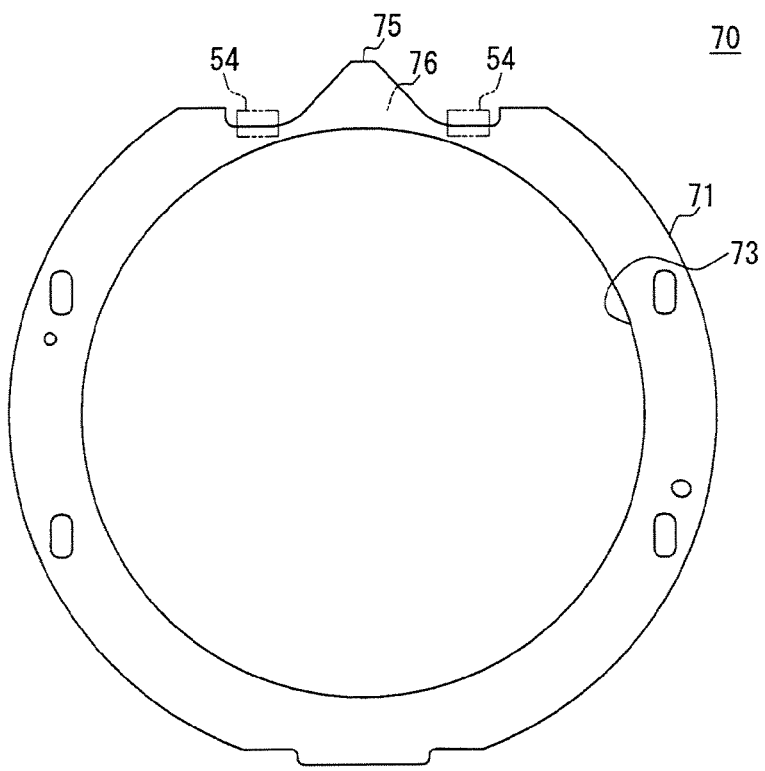
FIG. 4 is a plan view for illustrating a buffer sheet according to one embodiment.

The buffer sheet 70 shown in FIGS. 2 and 4 is made of, for example, polyurethane or the like, so that the buffer sheet 70 is easily deformable than the LCD unit 20 and the light guide 40 are. The buffer sheet 70 has a buffer main body portion 71. While being compressed in the displaying direction, the buffer main body portion 71 is located (sandwiched) between the LCD unit 20 and the light guide 40 which are held by the main body member 51. By a restoring force, the buffer main body portion 71 presses the LCD unit 20 against the tip portions 55 and presses the light guide 40 against the mounting portion 52. This secures close contact between the LCD unit 20 and the tip portions 55, and close contact between the light guide 40 and the mounting portion 52, thereby minimizing backlashes of these elements 20 and 40 relative to the main body member 51. The buffer main body portion 71 defines a buffer opening 73, which overlaps the display opening 31 in the displaying direction and is larger than the display opening 31. The light emitted from the emission surface 44 passes through the buffer opening 73 so that the light is incident on the LCD unit 20. Because of the buffer opening 73, the buffer main body portion 71 as a whole has an annular shape so as to surround the emission surface 44.

Figure 3:
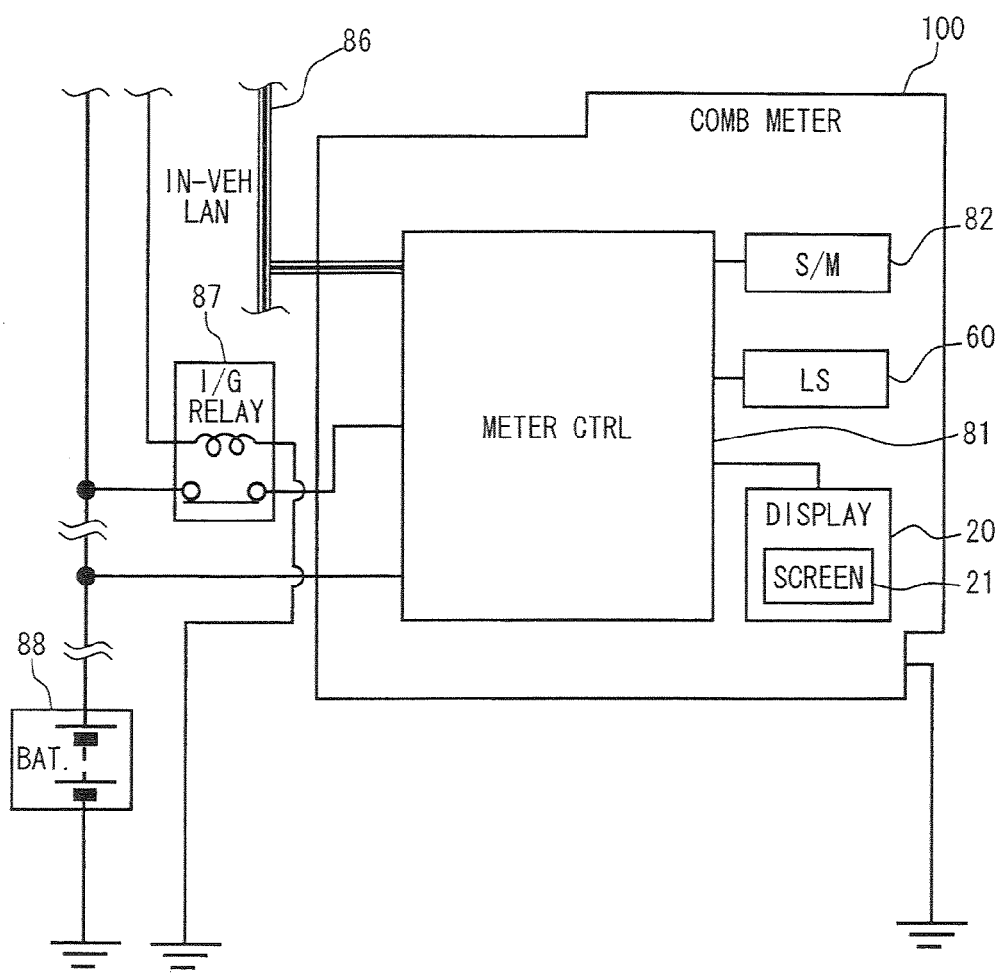
FIG. 3 is a block diagram illustrating an electric configuration of the combination meter according to one embodiment.

Next, explanation on the meter controller 81 will be given with reference to FIGS. 1 and 3. The stepper motor 82 acts as a mechanism for rotating the pointer 16. The pointer 16 is attached to a rotation shaft of the stepper motor 82. The stepper motor 82 is connected to the meter controller 81. The stepper motor 82 rotates the rotation shaft based on a control signal outputted from the controller 81.

The meter controller 81 includes a microcomputer, which operates according to a program or the like. The meter controller 81 acquires, for example, information on the rotation speed of the output shaft, information on vehicle speed, information on navigation, or the like outputted to an in-vehicle local area network (LAN) 86. Then, the meter controller 81 outputs a control signal, which is based on the acquired information, to the stepper motor 82 to control the rotation of the pointer 16. In addition, the meter controller 81 applies a voltage to the light source 60 to control light emission from the light source 60. Furthermore, based on the acquired information, the meter controller 81 draws each image 11, 12 to be displayed on the LCD unit 20 and outputs a data of the image to control the display on the display screen 21.

In the foregoing configuration, when an ignition of a vehicle is turned on, a voltage is applied to an ignition relay 87 and the ignition relay 87 is brought into an electrically-conducting state. In this manner, supply of electric power from a battery 88 to the combination meter 100 is started, and the combination meter 100 starts displaying the tachometer 15 and the multi-information display 10.

(Buffer Sheet Structure)

Figure 5:
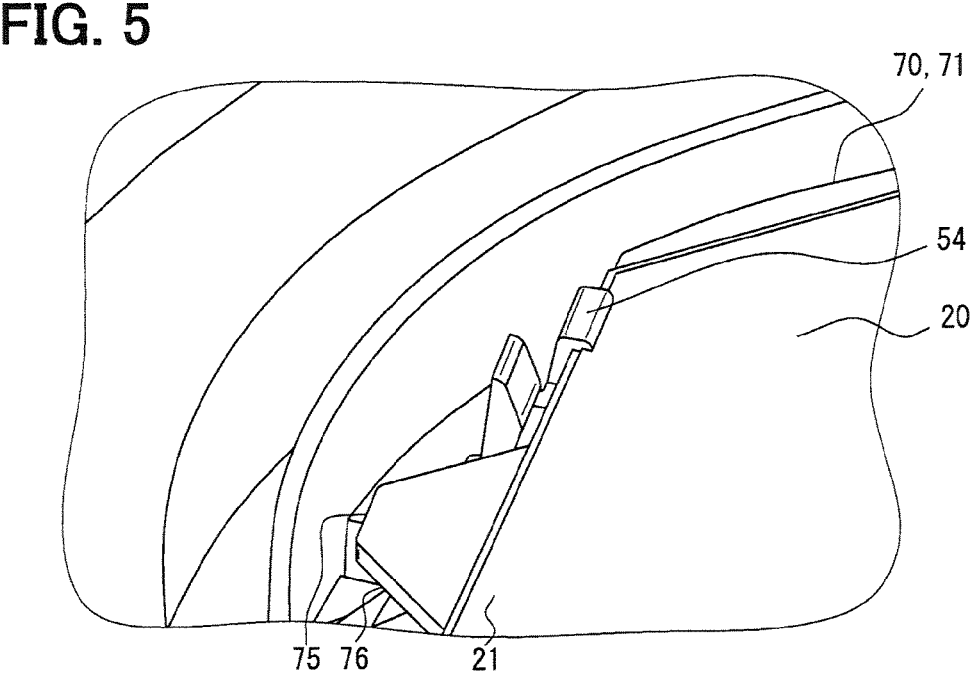
FIG. 5 is a perspective view showing a light block portion covering a reached region according to one embodiment.

Next, the buffer sheet 70 of the combination meter 100 will be more specifically described with reference to FIGS. 2, 4, and 5.

The buffer sheet 70 further has a light block portion 75. The light block portion 75 has substantially the same thickness as the buffer main body portion 71. The light block portion 75 protrudes from the buffer main body portion 71 along the opposing surface 41. The light block portion 75 covers a reached region 42 of the opposing surface 41 and a specific part of the opposing surface 41 that is disposed outward of an outer end of the LCD unit 20. In the present disclosure, the reached region 42 of the opposing surface 41 refers to a region to which a direct light DL reaches. The direct light DL refers to a part of the light that radiated from the light source 60 toward the display opening 31. Specifically, the direct light DL refers to the light that, after being radiated from the light source 60 toward the display opening 31, travels straight toward the display opening 31.

Specifically, the light block portion 75 has a trapezoidal shape whose width gradually decreases with increasing distance from the buffer main body portion 71 in a direction of protruding the light block portion 75. This trapezoidal shape is also a projection shape, which is a shape of the reached region 42 and the reflecting surface 47 projected in the displaying direction. An area of the light block portion 75 is larger than an area of the projection shape, which is obtained by projecting the reached region 42 and the reflecting surface 47. Thus, the light block portion 75 can reliably cover the reached region 42. In addition, the light block portion 75 extends from a place between a pair of adjacent holding claws 54, and thus, the light block portion 75 is pressed against the reached region 42 and brought into close contact with the reached region 42. In addition, if the buffer sheet 70 is made of white polyurethane, the light block portion 75 has a high reflectivity as well as a light blocking property. Therefore, a surface of the light block portion 75 contacting with the reached region 42 serves as a direct light reflecting surface 76, which can reflect light. The direct light reflecting surface 76 reflects the direct light DL toward the backlight portion 43.

The foregoing function of the light block portion 75 will be specifically described with reference to FIG. 2. Since the light block portion 75 covers the reached region 42 (the region to which the direct light DL reaches), the direct light reflecting surface 76 reflects the direct light DL toward the backlight portion 43. Accordingly, it is possible to prevent the direct light DL from passing through an outer peripheral side of the buffer main body portion 71 and reaching the LCD unit 20. Therefore, a situation in which the display screen 21 is illuminated with the direct light DL can be avoided.

In addition, since the light block portion 75 protrudes from the buffer main body portion 71, addition of a member for blocking light can be avoided. Moreover, the buffer main body portion 71, which is interposed between the LCD unit 20 and the light guide 40 while being in a compressed state, is solidly fixed by the LCD unit 20 and the light guide 40. Accordingly, even when vibration is continuously inputted, the light block portion 75 is not displaced from the light guide 40. As a result, the light block portion 75 can continuously cover the reached region 42 and continue to block the direct light DL. Therefore, it is possible to reduce non-uniform light emission in the illumination of the display screen 21, while preventing a configuration of the combination meter 100 from becoming complicated.

Moreover, according to the present embodiment, the direct light DL is reflected by the light block portion 75 toward the backlight portion 43. This increases an amount of light emitted from the emission surface 44 toward the display screen 21. Therefore, it is possible to achieve improvement of brightness of the illumination, while reducing the non-uniform light emission in the illumination of the display screen 21.

Furthermore, according to the present embodiment, the light block portion 75 is larger in size than the reached region 42. Because of this, the light block portion 75 can reliably cover the reached region 42 and properly fulfills the function of blocking the direct light DL. Thus, with high reliability, the direct light DL is inhibited from reaching the display screen 21, and therefore, the non-uniform light emission in the illumination of the display screen 21 can further be reduced.

In the present embodiment, the LCD unit 20 can correspond to a display unit; the display plate 30 can correspond to an opening member; the light guide 40 can correspond to a light transmission member; the backlight portion 43 can correspond to an emission main body portion; the main body member 51 can correspond to a holder; the mounting portion 52 can correspond to a support portion; the tip portion 55 can correspond to a holding portion; the buffer sheet 70 can correspond to a buffer member; and the combination meter 100 can correspond to a display apparatus.

(Other Embodiments)

Embodiments are not limited to the above-described embodiment. Examples of other embodiments will be illustrated.

In the foregoing embodiment, the buffer sheet 70 is made of, for example, white polyurethane. However, the color and material of the buffer sheet 70 can be changed appropriately. For example, a black polyurethane sheet, which absorbs majority of the direct light DL, may be interposed as the buffer member between the LCD unit 20 and the light guide 40. It may also be possible that a typical buffer material, such as a sheet member of rubber or the like, is interposed as the buffer member between the LCD unit 20 and the light guide 40.

In the foregoing embodiment, the shape of the light block portion 75 is a trapezoidal shape. However, the shape of the light block portion can be changed appropriately. As long as he light block portion 75 can cover the reached region 42, the shape of the light block portion may be, for example, a rectangular shape, a semi-circular shape, or the like. Also, the thickness of the light block portion may be different from that of the buffer main body portion 71. The light block portion may also be bonded to the reached region 42 so as to reliably block the direct light DL.

In the foregoing embodiment, the buffer sheet 70 has a single light block portion 75. However, when multiple light guide portions are formed in the light guide, multiple light block portions for covering respective reached regions formed in the individual light guide portions may be provided in the buffer member, or alternatively, a light block portion shaped to cover the entire reached region extending over the multiple light guide portions may be provided in the buffer member.

In the foregoing embodiment, in the buffer sheet 70, the buffer main body portion 71 is formed into an annular shape. However, the shape of the buffer main body portion can be changed appropriately. For example, when the display screen and the display opening each are formed in a rectangular shape, the buffer main body portion may be formed into a rectangular annular shape. Additionally, multiple divided-portions of the buffer member may constitute the buffer main body portion.

In the foregoing embodiment, the light guide 40, the buffer sheet 70, and the LCD unit 20 are successively stacked in the displaying direction from the mounting portion 52. Additionally, the holding claws 54 extending from the mounting portion 52 in the displaying direction fix these components 40, 70. However, a light guide, a buffer sheet, and a LCD unit may be mounted on a mounting portion that is located in the displaying direction from the light guide, the buffer sheet and the LCD unit. Additionally, the light guide, the buffer sheet, and the LCD unit may be fixed by holding claw(s) that extends from the mounting portion in the rearward direction. This structure is different from the foregoing embodiment in a correspondence between: the LCD unit and the light guide; the tip portions and the mounting portion when the buffer sheet presses the LCD unit and the light guide. Specifically, by the restoring force, the buffer sheet may press the LCD unit against the mounting portion while pressing the light guide against the tip portions.

In the above examples, the present invention is embodied in a structure for illuminating a display (e.g., multi-information display 10) in the combination meter 100, which combines (i) the pointer display portion such as the tachometer 15 or the like with (ii) the multi-information display 10 or the like. However, the present invention can be embodied in a structure for illuminating a display in a display apparatus that displays all information by using image(s) on a LCD unit.

According to the present disclosure, a display apparatus can be provided in various forms.

For example, according to a first example, a display apparatus may be configured as follows. The display apparatus includes a display unit, an opening member, a light source, a light transmission member, a holder, and a buffer member. The display unit has a display screen for displaying information in a displaying direction. The opening member is located in a displaying direction of the display unit and defines a display opening in a region that overlaps the display screen in the displaying direction. The light source is located at a place other than a region that overlaps the display opening in the displaying direction. The light source radiates a light for illuminating the display screen. The light transmission member is made of a light transmission material, and includes an emission main body portion and a light guide portion. The emission main body portion is located on an opposite side of the display unit from the opening member so that the display unit is located between the emission main body portion and the opening member, and the emission main body portion emits the light from the light source toward the display screen in the displaying direction. The light guide portion protrudes from the emission main body portion toward the light source to guide the light from the light source to the emission main body portion. The holder holds the light transmission member and the display unit. The holder includes a support portion and a holding portion. The support portion supports the light transmission member. The holding portion opposes the support portion. The light transmission member and the display unit are held between the support portion and the holding portion. The buffer member includes a buffer main body portion and a light block portion. The buffer main body portion is sandwiched between the display unit and the light transmission member while being compressed, so that by a restoring force, the buffer main body portion presses the display unit toward one of the support portion and the holding portion and presses the light transmission member toward the other of the support portion and the holding portion. The light block portion protrudes from the buffer main body portion along an opposing surface of the light transmission member opposing the display unit, and covers a reached region of the opposing surface of the light transmission member. The reached region of the opposing surface of the light transmission member is a region to which a direct light radiated from the light source toward the display opening reaches.

According to the above display apparatus, the reached region of the opposing surface of the light transmission member, to which the direct light radiated from the light source toward the display opening reaches, is covered with the light block portion having a light blocking property. Because of this, a situation where the direct light, which travels straight in its radiating direction and passes through the light guide portion, illuminates the display screen of the display unit, does not occur. In addition, the light block portion, which protrudes from the buffer main body portion along the opposing surface of the light transmission member, can eliminate the need to add a member for blocking the light. Moreover, since the buffer main body portion in a compressed state is held between the display unit and the light transmission member, the light block portion protruding from the buffer main body portion is prevented from being displaced of the light transmission member even when vibration is continuously inputted from an outside. As a result, the light block portion can continue to cover the reached region of the opposing surface reached by the direct light and can continue to block the direct light. Therefore, it is possible to reduce un-uniform light emission in illuminating the display screen, while preventing a structure of the display apparatus from becoming complicated.

In the above display apparatus, the light block portion may be arranged to reflect the direct light to the emission main body portion. According to this configuration, the direct light is reflected by the light block portion toward the emission main body portion. This increases an amount of the light emitted from the emission main body portion toward the display screen. Therefore, it is possible to improve brightness of the illumination while reducing the non-uniform light emission in the illumination of the display screen.

In the above display apparatus, the light block portion may be larger than the reached region of the opposing surface. According to this configuration, the light block portion can cover the reached region surely CaO fulfill a function of blocking the direct light. As a result, with high reliability, the direct light is prevented from reaching the display screen, and therefore the non-uniform light emission in the illumination of the display screen can further be reduced.

The present disclosure is not limited the above embodiments and modifications thereof. That is, the above embodiments and modifications thereof may be modified in various ways without departing from the sprit and scope of the present disclosure.

What is claimed is:

1. A display apparatus comprising:
   a liquid crystal display unit, of an in-vehicle meter, the liquid crystal display unit including a display screen for displaying information;
   an opening member that is located in a displaying direction of the liquid crystal display unit and defines a display opening in a region that overlaps the display screen in the displaying direction;
   a light source that is located at a place other than a region that overlaps the display opening in the displaying direction, wherein the light source radiates a light for illuminating the display screen;
   a light transmission member that is made of a light transmission material and includes
      a backlight portion that is located on an opposite side of the liquid crystal display unit from the opening member so that the liquid crystal display unit is located between the backlight portion and the opening member and the light from the light source is diffused inside the backlight portion and emitted toward the display screen in the displaying direction, and
      a light guide portion that protrudes from the backlight portion toward the light source to guide the light from the light source to the backlight portion;
   a holder holding the backlight portion and the liquid crystal display unit of the in-vehicle meter to hold the light transmission member and the liquid crystal display unit, wherein the holder includes
      a support portion that supports the light transmission member, and
      a holding portion that opposes the support portion, wherein the light transmission member and the liquid crystal display unit are held between the support portion and the holding portion; and
   a buffer member that includes
      a buffer main body portion that is sandwiched between the liquid crystal display unit and the backlight portion while being compressed, so that by a restoring force, the buffer main body portion presses the liquid crystal display unit toward one of the support portion and the holding portion and presses the light transmission member toward the other of the support portion and the holding portion, and
      a light block portion that is a part of the buffer main body portion and protrudes laterally from the buffer main body portion along an opposing surface of the light transmission member, the opposing surface being a surface opposing the liquid crystal display unit, wherein the light block portion covers a reached region of the opposing surface of the light transmission member, wherein the reached region of the opposing surface of the light transmission member is a region to which a direct light radiated from the light source toward the display opening reaches; wherein the opposing surface of the light transmission member faces and is parallel to the liquid crystal display unit and has a specific part that is disposed outward of an outer end of the liquid crystal display unit in a direction away from a center of the liquid crystal display unit;

a section of the light block portion of the buffer member is disposed outward of the outer end of the liquid crystal display unit in the direction away from the center of the liquid crystal display unit and covers the specific part of the opposing surface of the light transmission member, the section of the light block portion disposed outward of the outer end of the liquid crystal display unit not being in direct contact with the liquid crystal display unit;

when viewed in a direction perpendicular to the display screen of the liquid crystal display unit, the light guide portion and the light source overlap with each other and do not overlap with the liquid crystal display unit;

the support portion of the holder does not cross a straight line that connects the light source to a part of a perimeter of the display opening closest to the light source among the perimeter of the display opening;

the light block portion of the buffer member crosses the straight line that connects the light source to the part of the perimeter of the display opening closest to the light source among the perimeter of the display opening; and when viewed in the direction perpendicular to the display screen of the liquid crystal display unit, the light block portion of the buffer member does not overlap with the display opening but overlaps with the light guide portion and the light source.

2. The display apparatus according to claim 1, wherein: the light block portion is arranged to reflect the direct light to the backlight portion.

3. The display apparatus according to claim 1, wherein: the light block portion is larger than the reached region of the opposing surface.

4. The display apparatus according to claim 1, wherein: the buffer member is a buffer sheet having an annular shape.

5. The display apparatus according to claim 1, wherein: the display apparatus is a meter mounted in a vehicle.

6. The display apparatus according to claim 1, wherein: the light guide portion of the light transmission member has a reflecting surface for reflecting and guiding the light, which is emitted from the light source and is traveling through the light guide portion, into the backlight portion; and the light block portion of the buffer main body portion protrudes laterally from the buffer main body portion along the opposing surface of the light transmission member to optically cover the reflecting surface of the light guide portion.

7. The display apparatus according to claim 1, wherein: the light guide portion has an incident surface opposing the light source;

the light emitted from the light source is incident on the incident surface to travel through the light guide portion;

the light guide portion has a bent-shape part through which the incident surface communicates with an emission surface of the backlight portion;

the bent-shape part of the light guide portion has a reflecting surface for reflecting and guiding the light, which is incident on the incident surface and is traveling through the light guide portion, into the backlight portion; and the light block portion covers an outside of the bent-shape part of the light guide portion to hang over the bent-shaped part of the light guide portion.

8. The display apparatus according to claim 7, wherein: the buffer main body portion has a light reflecting surface opposing the backlight portion.

9. The display apparatus according to claim 1, wherein the display apparatus does not include a rotating pointer.

10. The display apparatus according to claim 1, wherein the liquid crystal display unit displays an image acquired from a controller.

11. The display apparatus according to claim 10, wherein the image is a colored image.

12. The display apparatus according to claim 1, wherein the liquid crystal display unit defines a display screen, the display screen defining a continuous planar surface without an aperture.

13. The display apparatus according to claim 1, wherein the light guided by the light guide portion to the backlight portion is the only light provided to the backlight portion.

14. The display apparatus according to claim 1, wherein the buffer member is made of white polyurethane or black polyurethane.

* * * * *